United States Patent [19]

Kelly

[11] 4,315,037
[45] Feb. 9, 1982

[54] PROCESS FOR FORMING A MOLDED ICE CONFECTION

[75] Inventor: Thomas R. Kelly, Wellingborough, England

[73] Assignee: Thomas J. Lipton, Inc., NJ

[21] Appl. No.: 148,604

[22] Filed: May 12, 1980

[30] Foreign Application Priority Data

May 11, 1979 [GB] United Kingdom ............... 16418/79

[51] Int. Cl.³ .............................................. A23P 1/00
[52] U.S. Cl. ..................................... 426/421; 62/356;
249/127; 264/313; 426/134; 426/389; 426/515
[58] Field of Search ................. 426/512, 515, 421, 91,
426/100, 134, 414, 389, 249; 264/313, 318;
62/340, 356; 249/127

[56] References Cited

U.S. PATENT DOCUMENTS

| | | | |
|---|---|---|---|
| 1,737,919 | 12/1929 | Crain | 426/421 |
| 1,758,567 | 5/1930 | Fernandez | 426/421 |
| 2,980,039 | 4/1961 | Jolly | 426/515 |
| 3,770,460 | 11/1973 | Vroman | 426/515 |
| 3,966,165 | 6/1976 | Psensky | 249/127 |
| 3,998,422 | 12/1976 | Putzer | 264/313 |
| 4,104,411 | 8/1978 | Pooler | 426/421 |

Primary Examiner—Joseph M. Golian
Assistant Examiner—George C. Yeung
Attorney, Agent, or Firm—Brumbaugh, Graves, Donohue & Raymond

[57] ABSTRACT

A process for forming a moulded confection, such as an ice confection, which has a protruding or re-entrant shape (i.e. with a surface portion having a negative draft angle with respect to a desired direction of mould release), characterized by:
(a) filling a mouldable confection mix into a thin-walled flexible elastic mould having a cavity corresponding to said protruding or re-entrant shape, and also having in its wall at least one thin-walled flexible elastic cleft or pleat; and
(b) solidifying the mouldable mix within the mould, and withdrawing the solidified confection mix from the mould so as to cause the mould to distort and the cleft or pleat to open or unfold and release a confection of said protruding or re-entrant shape from the mould.

8 Claims, 5 Drawing Figures

PROCESS FOR FORMING A MOLDED ICE CONFECTION

This invention relates to improved processes for producing moulded confections, for example moulded ice confections, and to improved mould apparatus suitable for use in such processes. In particular and convenient embodiments, the invention relates for example to forming ice confections such as ice lollies, each comprising a moulded ice confection part and an attached handle part such as a stick.

We have previously described (in our UK Pat. No. 1,508,589, and corresponding U.S. Pat. No. 4,104,411, incorporated herein by reference, and West German Pat. No. 25 13 201) a method for forming such ice confections with a re-entrant shape; our previous process comprises filling ice confection mix into thin-wall flexible elastic moulds of re-entrant cavity shape, inserting a handle into the ice confection mix in each mould, freezing the mixes thereby anchoring the handles, and withdrawing the handles so as to distort the moulds during release of ice confections of re-entrant shape therefrom.

This method has allowed quick and convenient mass-production of many ice confection shapes which could previously be produced (if at all) only by complex and cumbersome methods.

Nevertheless there are still certain re-entrant shapes which are difficult if not impossible to handle by our above-mentioned method, and in other cases the ease of mould release in the course of carrying out the method is less than would be desirable.

By the present invention we have modified the flexible moulds used in the process, to facilitate mould release and to render many previously difficult ice confection shapes now accessible to manufacture.

According to the present invention we provide an improved process for forming a moulded confection, e.g. an ice confection, which has a protruding or re-entrant shape (i.e. with a surface portion having a negative draft angle with respect to a desired direction of mould release); the improved process comprises:
 (a) filling a mouldable confection mix into a thin-walled flexible elastic mould having a cavity corresponding to said protruding or re-entrant shape, and also having in its wall at least one thin-walled flexible elastic cleft or pleat;
 (b) solidifying the mouldable mix within the mould, and withdrawing the solidified confection mix from the mould, so as to cause the mould to distort and the cleft or pleat to open or unfold and release a confection of said protruding or re-entrant shape from the mould.

Correspondingly the invention also provides an improved thin-walled flexible elastic mould suitable for moulding confections in protruding or re-entrant shape, the improved mould having a cavity corresponding to said protruding or re-entrant shape and also having in its wall at least one thin-walled flexible elastic cleft or pleat capable of opening or unfolding to facilitate release of solidified contents of said protruding or re-entrant shape from the mould. Such an improved mould can form the essential part of (otherwise known, e.g. as required for the process of GB Pat. No. 1,508,589) improved apparatus for the production of moulded confections by the improved process according to the invention.

The improved process, mould and apparatus have been found particularly applicable for example to the moulding of ice confections such as ice lollies from confection mixes frozen by means of an externally applied freezant to solidify them in the mould: optionally, a handle can be inserted before the solidification/freezing to facilitate withdrawal of the moulded product afterwards. Such production of ice confections can conveniently be performed in multiple by carrying a plurality of moulds and their eventual contents simultaneously through the process. Among the novel moulded confectionery products according to the invention which can be made using the process and apparatus of this invention are those with a distal portion (e.g. bulbous end) of at least twice or more, even three times or more than four times, the perimeter of an intermediate portion or neck closer to the end formed at the mouth of the mould.

Improved moulds according to the invention can suitably comprise one or a plurality of the above-described clefts or pleats, which can suitably extend outwardly from the mould body, for example substantially parallel to the desired direction of mould release, which is of course the direction extending towards the open end of the mould from the opposite (distal) part. In a convenient embodiment described below there are four such clefts or pleats spaced at approximately equal 90° angles apart about the axis of the direction of mould release. A convenient rule of thumb for the designs is that the perimeter of the pleated or clefted part of the mould, in transverse section, is at least equal to the perimeter of any bulbous or more distal part of the mould, e.g. 10–30% or even 50% more in resistant cases.

In an alternative embodiment, for producing apertured moulded products, the cleft can be formed by two opposite wall portions of the mould to be addressed together during the moulding operation, each surrounded by portions of the wall of the mould cavity.

It will be apparent that the clefts of pleats in the improved moulds according to the invention allow the mould to gape more widely open than would otherwise be the case during extraction of the solid contents. Accordingly, re-entrant or protruding confection shapes which have a proximal part (relative to the open end of the mould) which is of substantially smaller cross-section than the cross-section of a more distal part, can be most conveniently extracted from the mould when, according to a preferred embodiment, the cleft(s) or pleat(s) extend from the said more distal part along the proximal part towards the open end of the mould, thus gaping open during withdrawal to allow easy extraction of the relatively large more distal part of the moulded shape through the proximal part of the mould up to the open end of the mould.

In a similar manner, the previously adpressed opposite wall portions of the cleft in the embodiment for producing apertured shapes can gape apart during withdrawal of the apertured moulded confection.

It can easily be arranged for the opposed walls of each cleft or pleat to be closely adpressed together during moulding, so that no corresponding fins or flanges are formed in the moulded product. This can, if desired, be achieved by any suitable clip. In the ice confection embodiment, it can be achieved by the external hydrostatic pressure of the freezant liquid. If by chance the exclusion of mix from the pleats or clefts is incomplete, any "webbing" formed can generally be removed by flash heat, e.g. before mould extraction, or in any other convenient way.

If the design requires, then a pleat or cleft in the mould may alternatively be arranged so that it is filled and a corresponding confection portion formed.

It can therefore be seen that a preferred process according to the invention is a process as claimed in our UK Pat. No. 1,508,589, in which the mould cavity has a relatively large distal end and a relatively narrow more proximal part, with one or more openable clefts or pleats extending along the mould wall from the distal end to the open end to gape open during withdrawal of the moulded ice confection and allow its easy extraction.

Latex rubber is the most desirable mould material we have found so far, on account of its good flexibility and resilience. The moulds can for example be made in a conventional manner by dipping a dummy product into a rubber latex composition to form a thin coating thereon: the clefts or pleats can be formed easily as desired by appropriately placed thin fins, ribs or plates on the dummy product. Corrugated fins can be used, for example, to give corrugated pleats yielding a larger increment of open mould perimeter per unit pleat width.

The number and form of the pleats can, of course, be varied in any desired manner to give a mould capable of gaping to the required extent.

The moulds described above can be used, for example, to modify an apparatus of otherwise known type for the production of moulded confections, and it may be convenient to install the moulds with their ends which are opposite their mouths anchored in some way, e.g. by an elastic extension of the mould body, or by a spring, to another part of the apparatus, e.g. a rigid framework surrounding and spaced apart from the mould. The elasticity and length of such anchoring pieces may be chosen at will, e.g. they may be sufficiently long and/or elastic to allow either no introversion of the mould during extraction of the mould contents, or full introversion, or partial introversion, according to convenience and according to the particular shape of the design of the confections being moulded.

Although the invention is specifically described by the Figures with respect to ice confection freezing, of course it will be clear to the reader skilled in the art that other moulded food products can also be made by moulds and methods according to this invention.

Preferred embodiments of the improved moulds according to the invention are described and illustrated below and with reference to the accompanying drawings, of which:

An example of the use of the described embodiments of moulds is in most respects as described above and in UK Pat. No. 1,508,589 (US-PS 4,104,411 and DE-OS 25 13 201) and such respects therefore need no further description here.

Figure 1:
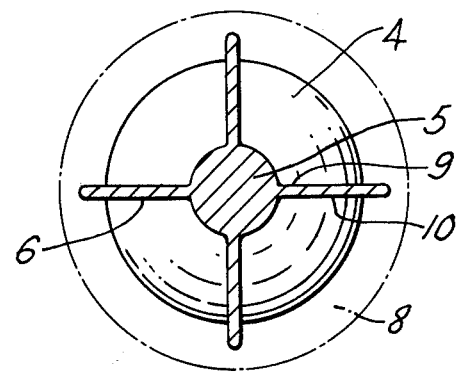
FIGS. 1 and 2 show diagrammatically a cross-section and elevation of a mould according to a first embodiment of the invention, for use in a process and apparatus according to the invention.
Figure 2:
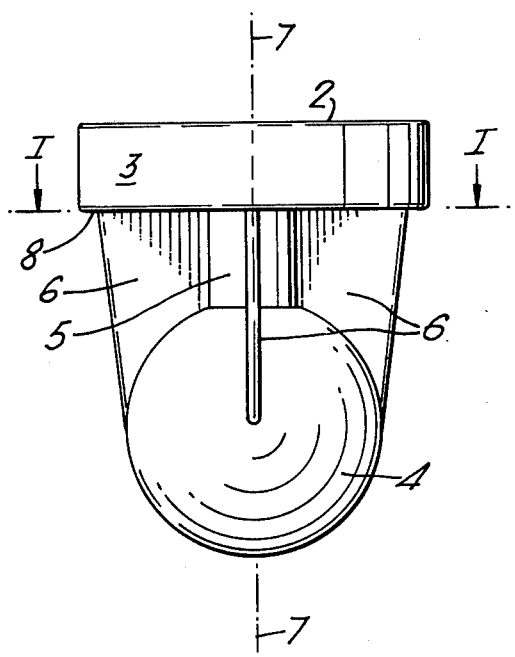

Referring to the drawings, FIGS. 1 and 2 show in cross-section and elevation respectively (cross-section on line I—I of FIG. 2) a thin-walled flexible elastic mould of rubber latex material, e.g. of 30 thousandths of an inch wall thickness. Mould 1 has an open end 2 and adjacent cavity portion 3, a relatively large hollow distal end cavity portion 4 and a relatively small and narrow more proximal cavity portion 5. The walls of mould 1 extend outwardly into four clefts or pleats 6 (3 of them shown in FIG. 2) angularly spaced at equal 90° angles about the axis 7 of the direction of mould release, all of them extending longitudinally parallel of that axis. Clefts or pleats 6 each consisting of a pair of opposed walls extend from the large distal mould cavity portion 4 along the more proximal cavity portion 5 to open into the floor 8 of the cavity portion 3 adjacent the open end 2 of the mould 1. The thus-opening pairs of top edges of the walls appear in FIG. 1 (one pair marked 9 and 10) where they are shown slightly apart for clarity, although in use during moulding they may easily be adpressed closely together leaving no space between (as by the hydrostatic pressure of surrounding freezant for example).

When the mould 1 is used for the moulding of an ice confection as illustrated in our above-cited previous specifications, the improved mould facilitates extraction of the formed ice confections in the following way. Each pair of opposed walls 9 and 10 constituting a cleft or pleat 6 gapes apart during withdrawal of the moulded confection, thereby opening or unfolding the cleft or pleat 6, to allow easy extraction of the moulded confection in a way that could not have been obtained, either so easily or at all, using the known mould and process. Furthermore, before the contents are frozen, the mould pleats help them to retain their shape against distension.

Figure 3:
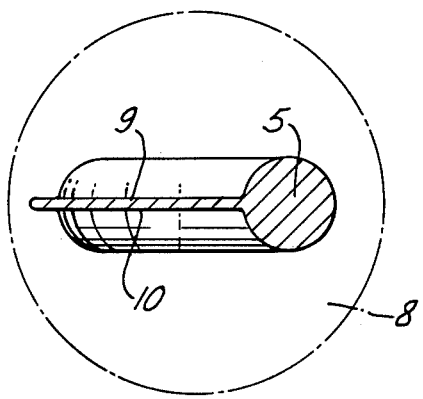
FIGS. 3 and 4 show diagrammatically a cross-section and elevation of a mould according to another embodiment of the invention, for corresponding use.
Figure 4:
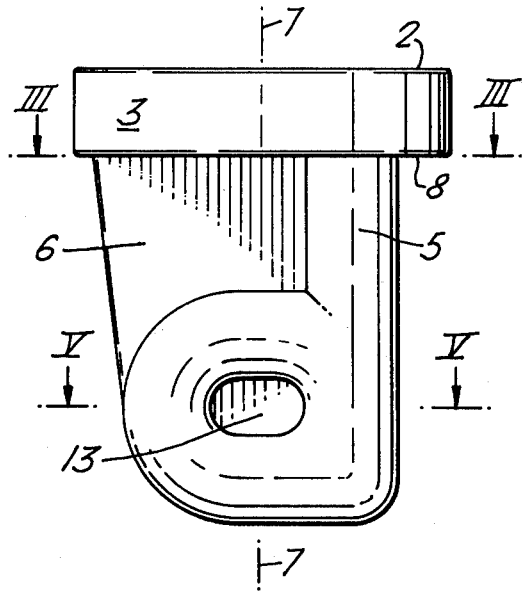
Figure 5:
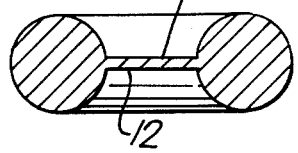
FIG. 5 is a further cross-section of the mould of FIGS. 3 and 4.

FIGS. 3, 4 and 5 show a further embodiment of the improved moulds. FIGS. 3 and 5 are sections on the lines III—III and V—V respectively in FIG. 4. This embodiment is for producing an apertured moulded ice confection product in the form of a letter P. Most of its parts correspond to those in the mould of FIG. 1 and are numbered with like numerals. Additionally, however, two opposite wall portions 11 and 12 (FIG. 5) contact each other or nearly contact each other to form a further cleft 13 in the mould cavity, surrounded by portions of the large distal cavity portion 4 so that an aperture forms in the moulded confection product. Wall portions 11 and 12 gape apart in a similar way to wall portions 9 and 10 during withdrawal of the apertured moulded ice confection product. During freezing the freezant presses wall portions 11 and 12 together to cause the aperture to be formed in the moulded product. Clearly this type of apertured product was not accessible at all by the method of manufacture previously disclosed in our above-cited specifications. Neither was a variant of such an apertured product in which the central pleat or cleft is filled to form a thin sheet in the final product, e.g. a lens-shaped sheet instead of the aperture.

It can easily be seen that our improved moulds are applicable to the easier removal of other kinds of moulded confection of many shapes. The accompanying drawings illustrate only simple shapes to explain the method, but figures with, e.g. sculpted heads, necks and bodies, and apertures between parts thereof, can easily be moulded in confections such as ice confections and extracted from the moulds using this invention.

I claim:

1. In a process for forming a molded ice confection which has a protruding or re-entrant shape which comprises filling a moldable confection mix into a thin-walled flexible elastic mold having a cavity corresponding to said protruding or re-entrant shape, freezing to solidfy the ice confection mix in the mold, and withdrawing the solidified confection mix from the mold so as to cause the mold to distort and release its contents, the improvement wherein said thin-walled mold has one or a plurality of openable thin-walled pleats extending along the mold wall from a relatively large distal part of said wall along a relatively narrow more proximal part of said wall and substantially parallel to direction of said withdrawal whereby said pleats gape open during said withdrawal and facilitate release of contents of said relatively large distal part of said ice confection mould.

2. In a process for forming a molded ice confection which has a protruding or re-entrant shape which comprises filling a moldable confection mix into a thin-walled flexible elastic mold having a cavity corresponding to said protruding or re-entrant shape, freezing to solidify the ice confection mix in the mold, and withdrawing the solidified confection mix from the mold so as to cause the mold to distort and release its contents, the improvement wherein said thin-walled mold has an openable thin-walled cleft formed by two opposite wall portions of the mold adpressed together during molding, whereby said cleft gapes open during said withdrawal to yield an apertured molded ice confection.

3. A process according to claims 1 or 2 characterised in that a handle is inserted into the mouldable mix before solidification to facilitate subsequent withdrawal of the solidified confection.

4. A process according to claims 1 or 2, characterised in that the mix is solidified by freezing with an externally-applied freezant.

5. A process according to claims 1 or 2, characterised in that the form of the mould and confection includes a distal portion having a perimeter at least twice the perimeter of an intermediate portion or neck closer to the mouth end of the mould.

6. A process according to claims 1 or 2, characterised in that the distal portion is in the form of a bulbous end of the mould and confection.

7. A process according to claims 1 or 2, characterised in that the mould has clefts or pleats approximately equally angularly spaced about the axis of the direction of mould release.

8. A process according to any of claims 1 or 2, characterised in that the perimeter of the pleated or clefted part of the mould, in transverse section, is at least equal to the perimeter of any more distal part of the mould.

* * * * *